Patented Oct. 6, 1953

2,654,671

UNITED STATES PATENT OFFICE 2,654,671

PAPER PRODUCT AND PROCESS FOR ITS PREPARATION

Julian L. Azorlosa, Wilmington, Del., assignor to Hercules Powder Company, Wilmington, Del., a corporation of Delaware No Drawing. Application July 17, 1948, Serial No. 39,371

16 Claims. (Cl. 92—21)

This invention relates in general to a treated paper and the process for preparing the same, and in particular to the preparation of a paper through the treatment thereof with a polymer or copolymer of a vinyl-substituted pyridine compound.

An ever important problem in the manufacture of paper has been the preparation of high-strength paper and, recently, the preparation of a paper product having an increased wet strength, whereby the paper is resistant to tearing or breaking even when wet. This property of increased strength and, particularly, wet strength has heretofore often been imparted to paper through the addition of materials such as thermosettings synthetic resins which impart a reasonably high degree of wet strength to the paper but which, at the same time, cause the paper to be somewhat more brittle or impart other undesirable characteristics thereto.

Now in accordance with the present invention, there is prepared a high wet-strength and dry-strength paper through the treatment of a paper furnish or web with a polymer or copolymer of a vinyl-substituted pyridine compound, optionally the polymer or copolymer being used in conjunction with a rosin size or the like. The polymer or copolymer of the vinyl-substituted pyridine compound may be added to the paper in the pulp form, for example, in the beater or may be applied to the preformed paper web. In either instance, the polymeric material may be utilized in the form of a latex or, optionally, in the form of an acidic aqueous solution or a solution in a suitable organic solvent. The polymer material may be added to the paper furnish or web without significant departure from standard papermaking operations and procedures to yield a treated paper characterized by having an increased tensile strength both in the wet and the dry condition.

The general nature and form of the invention having been set forth and described, the following examples are presented in illustration, but not in limitation, of specific methods of carrying out the invention.

Example 1

A copolymer of 2-vinylpyridine and butadiene was prepared in latex form by tumbling the following mixture in a sealed air-free bottle for 11 hours at 40° C.: 75 parts 2-vinylpyridine, 25 parts butadiene, 5 parts of the sodium soap of disproportionated rosin, 0.5 part of a commercial lauryl mercaptan (a mixtrue of $C_{12}$, $C_{14}$, and $C_{16}$ mercaptans), 0.3 part potassium persulfate and 180 parts water. After tumbling for 11 hours at 40° C., the mixture was 72% converted to the copolymer and contained 9.16% nitrogen (Kjeldahl) on a dry basis corresponding to 70.5% vinylpyridine and 29.5% butadiene.

To the crude reaction mixture was added 0.1% hydroquinone (based on total solids in the mixture), and the residual monomers removed under vacuum. The resulting copolymer latex contained about 40% total solids and was an excellent copolymer material for the preparation of a high wet-strength and high dry-strength paper.

Example 2

The copolymer latex of Example 1 and a dry, substantially completely saponified rosin size were added directly to a beater containing a 3% bleached sulfite pulp slurry, to yield a paper furnish containing 5% copolymer and 3% rosin size based on the dry weight of pulp. The pH of the slurry was then brought to 4.5 through the addition of papermaker's alum and the furnish then formed into paper sheets by conventional procedures. The resulting paper was dried at 110° C. to yield a finished paper having an execellent color, appearance and feel, and characterized by having a high wet and dry-tensile strength.

A similar paper was prepared simultaneously from a 3% slurry of bleached sulfite pulp treated with 3% rosin size (based on the dry weight of pulp). This furnish was sheeted and dried in an identical manner and was used as a comparative sample in tests with the paper containing rosin size together with the copolymer.

The paper containing 3% rosin size and no copolymer showed test results of 3.3 lb./in. wet-tensile strength and 20.5 lb./in. dry-tensile strength as compared with test results of 6.6 lb./in. wet-tensile strength and 25.8 lb./in. dry-tensile strength for corresponding tests with 3% rosin size and 5% copolymer.

Example 3

A copolymer of acrylonitrile and 2-vinylpyridine was prepared by heating together 31 parts 2-vinylpyridine, 7.35 parts acrylonitrile and 0.3 part benzoyl peroxide for 21 hours at 50° C. in the absence of air. The copolymer corresponded to 19% acrylonitrile and 81% 2-vinylpyridine and was characterized by being a hard, yellow product readily soluble in aqueous acid.

Twenty-seven and six-tenths parts of the copolymer was dissolved in 650 parts of 0.65 N hydrochloric acid and the solution was then adjusted to a pH of 2.4 by means of dilute sodium hydroxide. Water was added to bring this solution to a 3.2% solids content and the resulting dilute solution was added to a 3% bleached sulfite pulp slurry in the following manner.

To a 3% bleached sulfite pulp slurry in a paper beater was added 3% dry saponified rosin size (based on pulp solids) and the mixture was brought to a pH of 4.5 through the addition of papermaker's alum according to standard papermaking operation. The pH of this slurry was then brought to 3.5 through the addition of dilute sulfuric acid after which the copolymer solution was added in the amount of 5% (based on weight of copolymer and pulp solids), and the pH was then adjusted to 5 through the addition of dilute sodium hydroxide. The furnish was sheeted and dried according to the procedure of Example 2 and was compared for wet and dry strength with a similar paper prepared under identical conditions in the absence of the copolymer.

The paper containing 3% rosin size and no copolymer was characterized by a wet-tensile strength of 3.2 lb./in. and a dry-tensile strength of 20.2 lb./in. as compared with test results of 7.1 and 26.2 lb./in., respectively, for the paper containing 3% rosin size and 5% vinylpyridine and acrylonitrile copolymer.

Example 4

A hard, orange-colored polymer of 2-vinylpyridine was prepared by heating 48.5 parts 2-vinylpyridine with 0.60 part 30% hydrogen peroxide under air-free conditions for 69 hours at 50° C. Thirty and six-tenths parts of the copolymer was dissolved in dilute hydrochloric acid obtained by mixing 24.5 parts of concentrated hydrochloric acid with 546 parts water. The solution of the polymer in dilute aqueous acid was added to a 3% bleached sulfite pulp slurry in a paper beater in the amount of 5% polymer based on dry pulp. The pH of the slurry was adjusted to 8 with dilute sodium hydroxide and a rosin size emulsion was added to the beater in the amount of 3% rosin size (based on dry weight of rosin size and weight of pulp) after which the pH of the slurry was adjusted to 5 with papermaker's alum. The resulting furnish was formed into sheets and was dried according to the procedure of Example 2.

The treated paper was tested for wet-tensile strength and dry-tensile strength in comparison with a control sample containing 3% rosin size and no polymer and prepared under identical conditions. The paper containing 3% rosin size and no polymer had a wet-tensile strength of 3.2 lb./in. and a dry-tensile strength of 20.2 lb./in. as compared with 6.5 lb./in. wet-tensile strength and 27.3 lb./in. dry-tensile strength of the paper containing 3% rosin size and 5% vinylpyridine copolymer.

Example 5

A copolymer of 2-vinylpyridine and styrene was prepared by heating together 23.2 parts 2-vinylpyridine, 10.9 parts styrene and 0.24 part benzoyl peroxide under air-free conditions for 20 hours at 50° C. The copolymer product was a hard, dark orange substance readily soluble in aqueous acid. Twenty-seven and one-tenth parts of the copolymer was dissolved in dilute hydrochloric acid prepared by mixing 29 parts hydrochloric acid with 600 parts water. The copolymer solution was adjusted to a pH of 2.10 through the addition of dilute sodium hydroxide and was brought to a solids content of 3.7% by the addition of water. This diluted copolymer solution was added to a beater slurry having 3% bleached sulfite in an amount of 5% copolymer based on the weight of dry pulp, and 3% rosin size (based on dry pulp) was added thereto. The furnish was brought to a pH of 5 and was formed into sheets according to the procedure of Example 3 to yield a sized, high wet-strength paper product.

The paper product thus prepared had a wet-tensile strength of 7.4 lb./in. and a dry-tensile strength of 26.6 lb./in. as compared with wet-tensile strength of 3.2 lb./in. and dry-tensile strength of 20.2 lb./in. for a paper prepared under identical conditions containing 3% rosin size and no added copolymer.

Example 6

The copolymer latex prepared according to Example 1 was used for the preparation of a high wet-tensile strength and high dry-tensile strength paper according to the following procedure. A 3% kraft pulp was treated with 1% dry rosin size in the beater and the furnish was brought to a pH of 4.5 through the use of papermaker's alum. This furnish was then formed into handsheets according to conventional practice and procedures and was pressed to a moisture content of about 65%. The copolymer latex of Example 1 was diluted to 2% solids and the moist handsheets were passed therethrough. The sheets were removed from the copolymer dispersion, again pressed to 65% moisture content, and were passed through a 37% solution of papermaker's alum. The sheets were then pressed and dried at 100° C. to yield a slack sized paper product having high wet-tensile strength and high dry-tensile strength.

Example 7

A copolymer of 2-methyl-5-vinylpyridine, styrene, and methyl acrylate was prepared by heating together 35 parts of 2-methyl-5-vinylpyridine, 5 parts of methyl acrylate, 6 parts of styrene, and 0.4 part of benzoyl peroxide for 24 hours at 70° C. in the absence of air. The resulting copolymer was characterized by being a hard, yellow product readily soluble in aqueous acid.

The copolymer was dissolved in dilute hydrochloric acid and used to treat bleached sulfite pulp according to the procedure of Example 3. The thus treated pulp was sheeted and dried and was substantially stronger than a similar paper prepared under identical conditions in the absence of a copolymer.

The agent which is utilized according to this invention to impart increased wet strength and dry strength to a paper product comprises a polymer or copolymer whose major monomer constituent is a vinyl-substituted pyridine compound. Thus, there may be used a polymerized vinylpyridine such as, for example, 2-, 3-, or 4-vinylpyridine which has been polymerized to a significant extent. Likewise, there may be used substituted vinylpyridine compounds such as alkyl-substituted pyridines and the like including, for example, 2-methyl-5-vinylpyridine, 4-methyl-2-vinylpyridine, 4-ethyl-2-vinylpyridine, vinyl-substituted quinolines, vinyl-substituted carbazoles, and various other vinyl-substituted N-heterocyclic aromatic compounds which are readily available and whose use will be obvious to those skilled in the art.

In addition to the polymers of the vinylpyridine compounds, there may also be utilized various copolymers of these same vinylpyridine materials with other interpolymerizable compounds. In addition to the comonomers named in the examples, there may be used related comonomers such as methyl methacrylate, methacrylonitrile, α-methylstyrene, and the like, in every case the comonomer being characterized by an ability to copolymerize with the vinylpyridine compounds. Those skilled in the art will recognize suitable comonomer compounds and will be able to select those compounds which will copolymerize with the vinylpyridine compounds.

The amount of comonomer compound which may be utilized in the preparation of a copolymer according to this invention is limited and, of course, varies with the nature of the comonomer. For example, when a major proportion of 2-vinylpyridine is copolymerized with a minor proportion of styrene, butadiene or acrylonitrile, methyl acrylate or the like, or with mixed comonomers of this type, there may be used a minor proportion; i. e., up to 50 mole per cent of the comonomer and, accordingly, in the range of about 50 to 100 per cent vinylpyridine. In all instances the vinyl-substituted pyridine compound will be present in greater than 50 mole per cent, thus in a major amount, whereas the comonomer or total comonomers will be present in less than 50 mole per cent, thus in a minor amount. Within this broad range, optimum results have been obtained through the use of copolymers prepared from between about two-thirds vinyl-substituted pyridine and one-third comonomer to polymerized vinyl-substituted pyridine by itself. Thus, adequate strength properties may be obtained through the use of a polymer or copolymer of a vinylpyridine compound containing a major proportion of a vinyl-substituted pyridine compound; i. e., from 50 to 100 mole per cent vinylpyridine and preferably from about 65 to 100 per cent vinylpyridine component.

The use of a relatively small amount of the polymer or copolymer imparts a significant degree of dry strength and wet strength to a paper treated therewith. The improvement in strength properties increases sharply with the addition of amounts of the polymer or copolymer up to about 6%, after which point the addition of further amounts of copolymer provide a satisfactory product but with less striking improvement resulting from the incorporation of the additional amounts of material. The highly satisfactory wet and dry-strength paper product is obtained through the use of amounts of polymer and copolymer up to as high as 15% based on the weight of the pulp with a preferred range of about 2 to about 6%. Thus, for example, utilizing a polymer or copolymer according to this invention in the amount of about 5% based on the weight of the pulp, there is obtained an improved paper product characterized by having substantially increased strength both in the wet and in the dry state.

There are available various methods for applying the selected polymer or copolymer to a paper product. For example, the copolymer or polymer is formed into an emulsion or latex and applied to the paper in that form and precipitated by an appropriate adjustment of pH or the like. Alternatively, the polymer or copolymer may be dissolved in an acidic aqueous solution or, if desired, in an organic solvent and applied to the paper in such a state. Additional variations are available through the selection of a convenient point of addition such as, for example, by addition of the polymer or copolymer to the paper prior to the sheet formation as in the beater, Jordan or similar point in the papermaking operation. Likewise, the polymer or copolymer may be incorporated with the paper by tub or machine sizing operations or at similar stages subsequent to the web formation. Intercombinations of these alternatives are possible and thus an emulsion of the strengthening agent may be utilized either prior to or subsequent to the web formation, and, likewise, an aqueous organic solvent solution of the polymer or copolymer may similarly be used either prior to or subsequent to the web formation.

Where an aqueous emulsion of the polymer or copolymer is utilized, the agent may be added to the paper material in conventional procedure as utilized with ordinary rosin sizing. Thus, the aqueous emulsion may be added to the paper at any convenient point and precipitating by the conventional use of papermaker's alum or other ingredients normally used to precipitate rosin sizing or the like on the paper fibers. This ready use of the aqueous emulsion makes the polymer or copolymer easily employed in conjunction with a rosin sizing composition, and, accordingly, a highly satisfactory paper product may be prepared utilizing a rosin size and the selected polymer or copolymer without significant departure from the conventional papermaking procedures and steps.

Likewise, when an aqueous solution of the polymer or copolymer is prepared, it generally will conveniently have a pH only slightly more acid than the conventional precipitating pH for a rosin size, and, accordingly, the polymer or copolymer can be dissolved in aqueous acid and readily added to a paper furnish. The polymer or copolymer will be precipitated on the paper as the pH of the furnish is brought to the pH of which the rosin size is conventionally precipitated, and, accordingly, this method may likewise be used without substantial departure from standard papermaking techniques and procedures.

The utility of applicant's invention is not limited to the particular type of paper pulp used, and, accordingly, applicant's invention may be utilized with the various types of kraft, soda, sulfite pulp, and the like as well as with the various chemical and semichemical paper pulps. By the same token, the invention may be utilized with various types of paper products such as paper, fiber board, molded pulp products, and the like. In all instances, the product produced by applicant's invention is characterized by having an increased dry strength and wet strength, by being relatively resistant to abrasion and by having a surface of improved printing properties and the like.

What I claim and desire to protect by Letters Patent is:

1. A high dry-strength and high wet-strength paper comprising cellulosic paper fibers and up to about 15% based on the weight of pulp of a polymeric material whose major monomer constituent is a vinyl-substituted pyridine compound.

2. A high dry-strength and high wet-strength paper comprising cellulosic paper fibers and up to about 15% based on the weight of pulp of a polymeric material whose major monomer constituent is 2-vinylpyridine.

3. A high dry-strength and high wet-strength paper comprising cellulosic paper fibers and about 2 to about 6% based on the weight of the pulp of a polymeric material whose major monomer constituent is a vinyl-substituted pyridine compound.

4. A high dry-strength and high wet-strength paper comprising cellulosic paper fibers and about 2 to about 6% based on the weight of the pulp of a polymeric material whose major monomer constituent is 2-vinylpyridine.

5. A high dry-strength and high wet-strength paper comprising cellulosic paper fibers and about 2 to about 6% based on the weight of the pulp of a copolymer whose major monomer constituent is 2-vinylpyridine and whose minor monomer constituent is butadiene.

6. A high dry-strength and high wet-strength paper comprising cellulosic paper fibers and about 2 to about 6% based on the weight of the pulp of a copolymer whose major monomer constituent is 2-vinylpyridine and whose minor monomer constituent is acrylonitrile.

7. A high dry-strength and high wet-strength paper comprising cellulosic paper fibers and about 2 to about 6% based on the weight of the pulp of a copolymer whose major monomer constituent is 2-vinylpyridine and whose minor monomer constituent is styrene.

8. A high dry-strength and high wet-strength paper comprising cellulosic paper fibers and about 5% based on the weight of the pulp of a copolymer whose major monomer constituent is 2-vinylpyridine and whose minor monomer constituent is butadiene.

9. In a process for the manufacture of paper having high wet-strength and high dry-strength properties, the step which comprises the addition of a polymeric material whose major monomer constituent is a vinyl-substituted pyridine compound in an amount up to about 15% based on the weight of the pulp to the paper furnish prior to the formation of a web.

10. In a process for the manufacture of paper having high wet-strength and high dry-strength properties, the step which comprises the addition of a polymeric material whose major monomer constituent is a vinyl-substituted pyridine compound in an amount between about 2% and about 6% based on the weight of the pulp to the paper furnish prior to the formation of a web.

11. In a process for the manufacture of paper having high wet-strength and high dry-strength properties, the step which comprises the addition of a polymerized vinyl-substituted pyridine compound in an amount between about 2% and about 6% based on the weight of the pulp to the paper furnish prior to the formation of a web.

12. In a process for the manufacture of paper having high wet-strength and high dry-strength properties, the step which comprises the addition of a copolymer whose major monomer constituent is a vinyl-substituted pyridine compound and whose minor monomer constituent is butadiene in an amount between about 2% and about 6% based on the weight of the pulp to the paper furnish prior to the formation of a web.

13. In a process for the manufacture of paper having high wet-strength and high dry-strength properties, the step which comprises the addition of a copolymer whose major monomer constituent is a vinyl-substituted pyridine compound and whose minor monomer constituent is acrylonitrile in an amount between about 2% and about 6% based on the weight of the pulp to the paper furnish prior to the formation of a web.

14. In a process for the manufacture of paper having high wet-strength and high dry-strength properties, the step which comprises the addition of a copolymer whose major monomer constituent is a vinyl-substituted pyridine compound and whose minor monomer constituent is styrene in an amount between about 2% and about 6% based on the weight of the pulp to the paper furnish prior to the formation of a web.

15. In a process for the manufacture of paper having high wet-strength and high dry-strength properties, the step which comprises the addition of a polymeric material whose major monomer constituent is 2-vinylpyridine in an amount between about 2% and about 6% based on the weight of the pulp to the paper furnish prior to the formation of a web.

16. In a process for the manufacture of paper having high wet-strength and high dry-strength properties, the step which comprises the addition of a copolymer whose major monomer constituent is 2-vinylpyridine and whose minor monomer constituent is butadiene in an amount between about 2% and about 6% based on the weight of the pulp to the paper furnish prior to the formation of a web.

JULIAN L. AZORLOSA.

References Cited in the file of this patent

UNITED STATES PATENTS

| Number | Name | Date |
|---|---|---|
| 1,716,654 | Moses | June 11, 1929 |
| 2,315,675 | Trommsdorf | Apr. 6, 1943 |
| 2,325,302 | Britt | July 27, 1943 |
| 2,338,602 | Schur | Jan. 4, 1944 |
| 2,354,574 | Carson | July 25, 1944 |
| 2,375,245 | Pretzel | May 8, 1945 |
| 2,402,020 | Cislak et al. | June 11, 1946 |
| 2,448,542 | McQueen et al. | Sept. 7, 1948 |
| 2,449,951 | Ney | Sept. 21, 1948 |
| 2,491,472 | Harmon | Dec. 20, 1949 |

FOREIGN PATENTS

| Number | Country | Date |
|---|---|---|
| 439,024 | Great Britain | Nov. 27, 1935 |
| 849,126 | France | Nov. 14, 1939 |

OTHER REFERENCES

Ser. No. 352,114, Schuster et al. (A. P. C.), published April 20, 1943.

Collins, Paper Ind. & Paper World, June 1943, pp. 263–269.